United States Patent
Cloup

[11] 3,836,276
[45] Sept. 17, 1974

[54] APPARATUS FOR MACHINING WORK-PIECES

[76] Inventor: Jean Cloup, 33-Latresne, France

[22] Filed: Aug. 21, 1972

[21] Appl. No.: 282,065

[30] Foreign Application Priority Data
Apr. 18, 1972 France .............................. 72.13657

[52] U.S. Cl. .................. 408/67, 83/708, 214/1 QC, 408/16, 408/69, 408/103
[51] Int. Cl. .......................................... B23b 39/06
[58] Field of Search ................ 408/67, 69, 103, 16; 214/1 QC, 1 QG; 144/208 G; 83/708

[56] References Cited
UNITED STATES PATENTS

| | | | |
|---|---|---|---|
| 1,916,025 | 6/1933 | Skeehan | 214/1 QC |
| 1,962,772 | 6/1934 | Hull et al. | 214/1 QC |
| 3,118,547 | 1/1964 | Dailey | 214/1 QC |
| 3,127,661 | 4/1964 | McConnell | 214/1 QC |
| 3,217,899 | 11/1965 | Makowski | 214/1 QC |
| 3,269,564 | 8/1966 | Doherty | 214/1 QC |
| 3,685,915 | 8/1972 | Vierstraete | 408/237 X |
| 3,687,301 | 8/1972 | Dailey | 214/1 QG |

Primary Examiner—Andrew R. Juhasz
Assistant Examiner—Z. R. Bilinsky
Attorney, Agent, or Firm—Clelle W. Upchurch

[57] ABSTRACT

Apparatus for orienting a work-piece, particularly a metal girder and holding it in position ready for machining, particularly drilling, comprises a machining unit displaceable with respect to a fixed bed. At least one deformable member is provided on which the work-piece rests and this member is fixed by its two ends to the tops of two substantially vertical bars. These bars are capable of sliding vertically and independently with respect to the bed and the latter includes a table on which the work-piece rests. The table is arranged in front of the machining unit. The deformable member or members generally comprise chains, but may be cables either of metal or textiles. Different means for clamping the work-piece are described.

13 Claims, 4 Drawing Figures

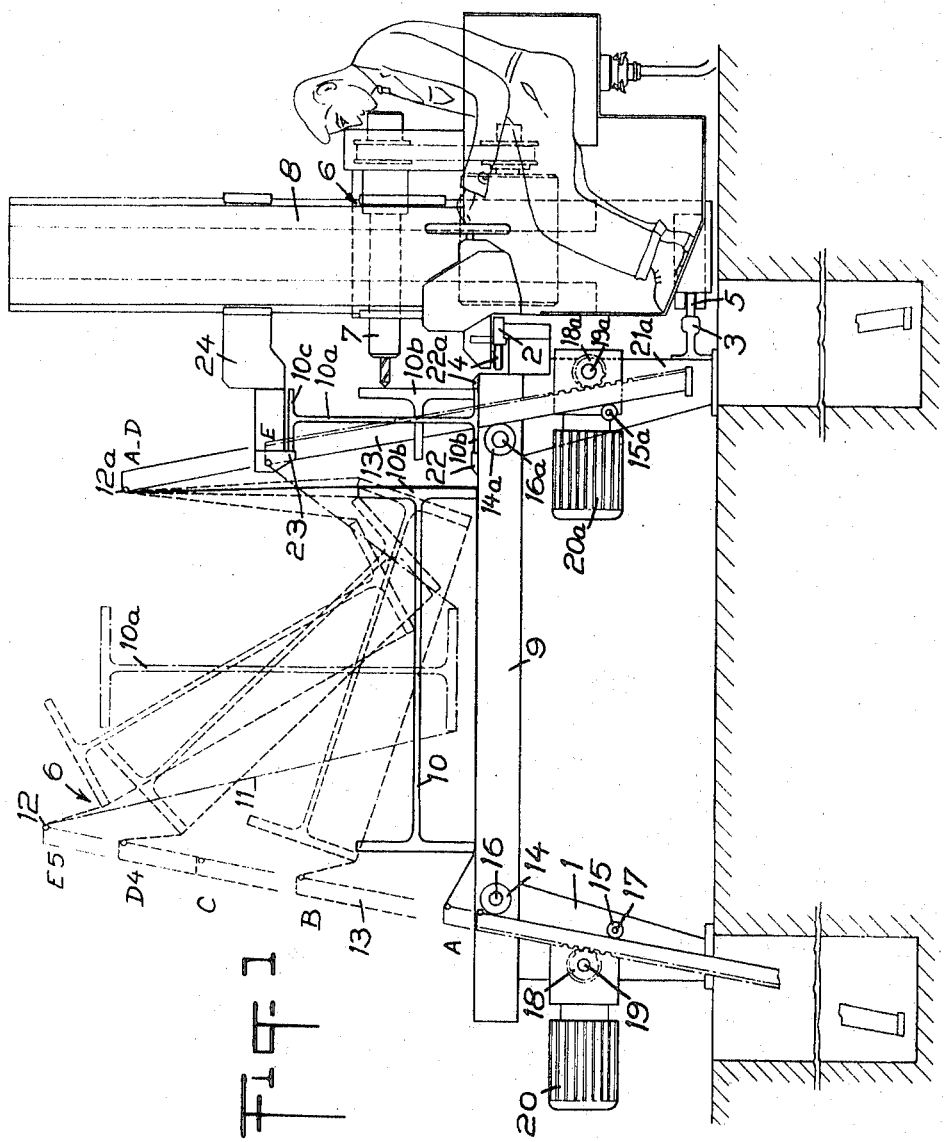

APPARATUS FOR MACHINING WORK-PIECES

The present invention relates to apparatus for orienting a work-piece, e.g., a metal girder, and holding it in position for machining.

To machine a girder, in particular to perforate it, it is necessary to offer up all its faces to a suitable machine in order to be able to drill it.

At the present time such operations require various ill-adapted lifting devices which involve a multiplicity of handling operations, as well as taking up a large amount of time in relation to the machining time.

Apparatus is also known in which girders to be machined are disposed on an endless chain mounted on two-drive sheaves, the chain, when moved, taking the girders with it and thus orienting them.

Such apparatus, however, is relatively complicated and does not allow lateral access due to the presence of a bulky frame-work containing the mechanism.

Since the two points on which the girder rests on the chain are at the same level, it is necessary for the chain to grip the girder to turn it.

Moreover, the known apparatus does not leave the working plane free to allow access to the girder.

It is important to hold the girder during machining at the very spot where the operation is being performed so as not to have to clamp the girder tightly along its whole length, which would result in too large a machine.

It is an object of the invention to provide apparatus which removes or minimises these drawbacks; it is a further object that the girder shall be forced to swivel even with no co-efficient of friction whatsoever.

With this and other objects in view, the present invention provides apparatus for the purpose hereinabove set forth, which comprises at least one deformable member on which the work-piece is arranged to rest and the two ends of which are fixed respectively to the top of two substantially vertical bars capable of sliding vertically and independently with respect to a machine bed which comprises a table on which the work-piece may rest and which is arranged in front of the machining unit.

According to one feature of the invention, the lower part of the work-piece is clamped by a set of jaws and its upper part abuts a stop or support member mounted on a horizontal arm which is capable of being moved vertically and horizontally on a pillar.

In a modification, the arm and the stop are replaced by a positive clamping device mounted on the pillar or upright and acting in the vertical direction on the work-piece which rests on the table while being machined.

This clamping device which, in particular, is formed by a ram mounted on an arm sliding on the pillar, is firmly fixed to the machining unit and moves with the latter. It avoids the necessity for the work-piece to be clamped along its whole length and forms a simple an inexpensive device.

Moreover this device has the advantage of having a rigid assembly which is closed at right angles to the machining operation and which is formed by the bed, the work-piece, the clamping device and the frame of the machine.

Furthermore, the fact of laying of the work-piece on the bed-table, which serves as a datum at right angles to the portion to be machined, allows the tool to be accurately positioned with respect to the lower face of the work-piece.

According to another feature of the invention the bed includes along its whole length a measuring member which slides longitudinally and which is firmly attached to an end-follower for the work-piece. This measuring member allows longitudinal positioning of the work-piece to be dispensed with, which saves time over the complete machining operation.

Moreover, this does away with setting-up to a zero-point and possibly allows operation using absolute numerical control without a floating zero-point and allows a numerical counter to be used without reset to zero.

According to another feature of the invention the movable machining unit is fitted with a ram whose movable member pushes the work-piece back after machining by one of its faces in order to bring it within the reach of the orienting means. This operation may be carried out in two stages by pushing back the two ends of the work-piece in succession.

In order that the invention may be more clearly understood, reference will now be made to the accompanying drawings, which show some embodiments thereof by way of example and in which:-

FIG. 1 shows a side-elevation view of a device for orienting metal girders and holding them in position.

Figure 2:
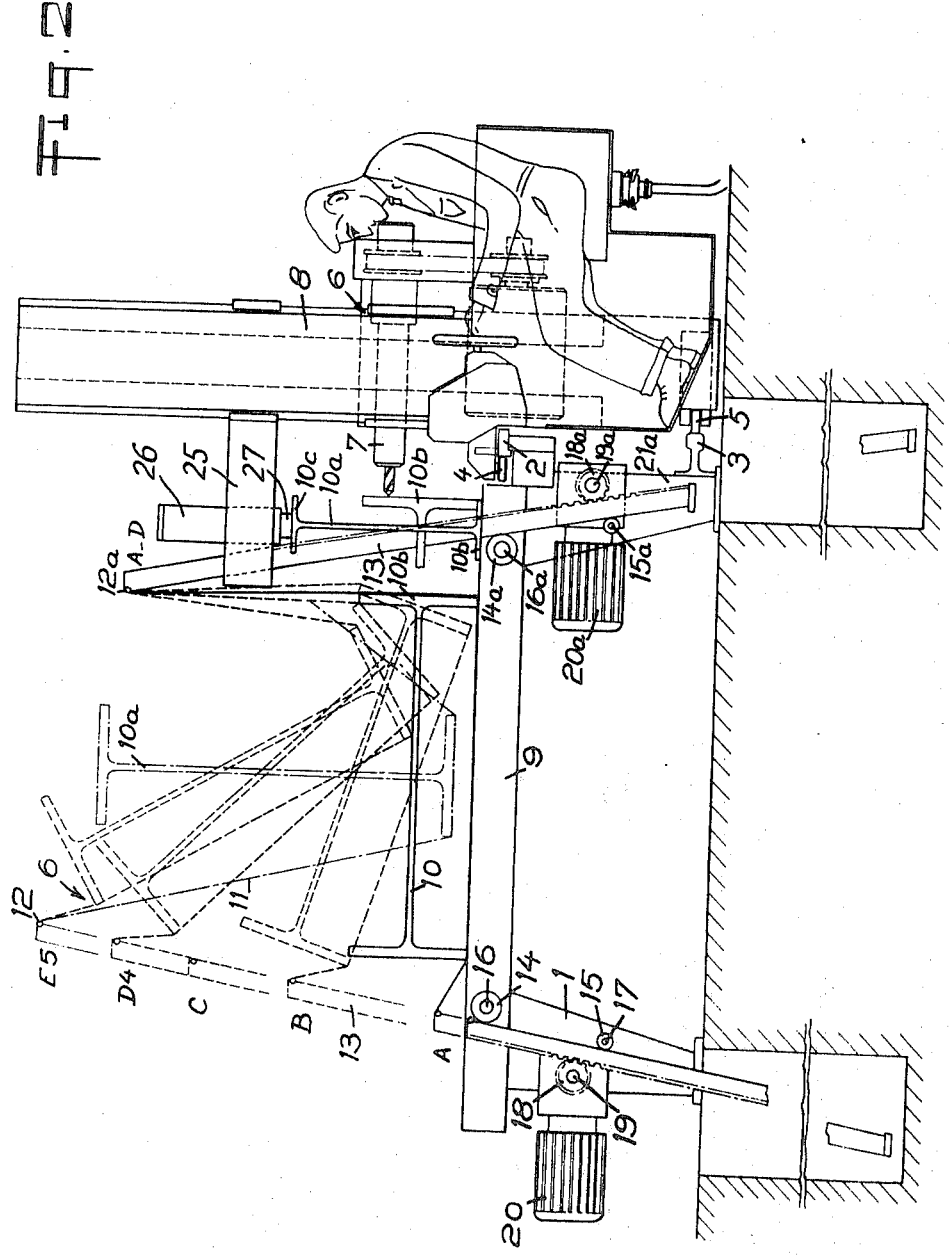
FIG. 2 shows a side-elevation view of the orienting means showing the clamping means.

Referring now to the drawings, in FIG. 1 is shown a fixed bed 1 which rests on the ground and which extends for a length suitable for work-pieces such as metal girders to be machined.

On one of the longitudinal edges of the bed are provided rails 2 and 3 from which is suspended, by means of rollers 4 and 5, a sliding machining unit 6 including, in particular, a drilling head 7 mounted to slide vertically and horizontally on a pillar 8.

In its upper part the bed 1 has a table 9 on which may rest a metal girder 10 to be machined which is supported by at least one deformable member 11 formed, in particular, by a cable, a band or a chain.

Although a single deformable member has been shown in the drawings, it will be apparent that a plurality of deformable members 11 could be used distributed at set intervals along the whole length of the girder.

Each deformable member 11 is fixed by its ends 12 and 12a to the tops of substantially vertical bars 13 and 13a respectively which are mounted to slide with respect to the bed 1 by means of rollers 14, 15 and 14a, 15a which revolve on axes 16, 17 and 16a, 17a, which are firmly attached to the bed, the said rollers cooperating with pinions 18, 18a which are keyed to shafts 19, 19a associated with drive means formed in particular by reduction motors, i.e., motors coupled to reduction gearing, and shown at 20, 20a.

The pinions 18, 18a mesh with racks 21, 21a provided on one side of the bars 13, 13a in order to drive the latter independently and thus to displace the deformable member 11 and turn the girder 10, the latter movement being carried out as follows:

When the girder 10 is in the position shown in solid lines in the Figure and when the bars 13, 13a are in position A the bar 13 is driven by means of the reduction motor 20 and slides upwards through the successive positions B, C, D in which the girder is shown by broken lines.

When the bar 13 is at position D it is driven further upwardly to reach position E, whereas the bar 13a is lowered to bring it into position E so that the girder 10 comes to the position shown in dotted and dashed lines in the drawing.

In this way the girder 10 has rotated through 90° by passing from position A to position E which enables the web 10a to be machined after the flanges 10b have been machined.

For machining the other faces, the procedure is the same as described above but in the opposite direction as regards the movement of the bars 13, 13a.

In order to machine the flanges 10b, for instance, the girder 10 must be held between two clamping jaws 22, 22a which are provided in a known way on the table 9 adjacent to the drilling head 7.

To machine the web 10a of wide girders for boxassemblies the jaws 22, 22a, between which the flanges 10b are clamped, are used in conjunction with a stop 23 against which one of the flanges 10c abuts.

The stop 23 is solidly attached to an arm 24 which is mounted to slide vertically and horizontally on pillar 8, so that the position of the stop 23 can be adjusted in accordance with the height and width of the girder.

FIG. 2 shows the fixed bed 1 which includes in its upper part a table 9 on which rests the lower flange 10b of the girder 10a. On one of the longitudinal edges of the bed is mounted a sliding machining unit 6 comprising a drilling head 7 sliding vertically and horizontally on a pillar 8.

According to the invention, a horizontal arm 25 is mounted to slide vertically on the pillar 8 and carries a ram 26 whose movable member 27 exerts a positive clamping action in the vertical direction on the upper flange 10c of the girder 10a which rests on the table 9 of the bed.

Figure 3:
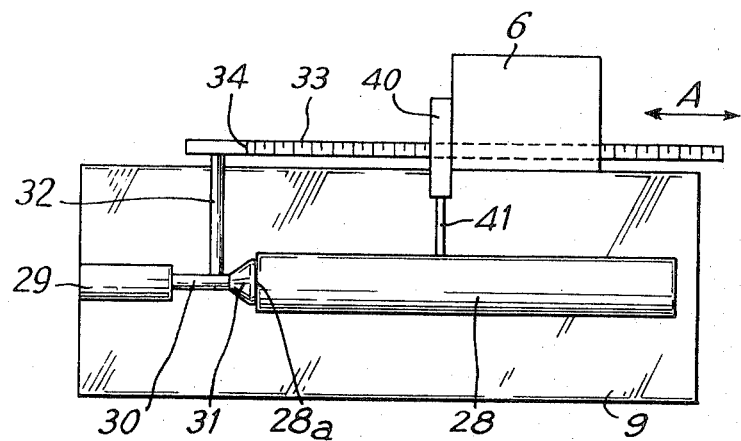
FIG. 3 shows a plan view of the device showing the measuring and follower means.

In FIG. 3 is shown the table 9 on which is laid out a girder 28 intended to be machined by means of the machining unit 6. At one end of the table 9 on the pillar 8, is mounted a ram 29 having a piston 30 slidable therewithin which bears at its end a follower 31 which is capable of coming into contact with the end 28a of the girder 28. To the piston 30 is fixed an arm 33 which carries a measuring device formed in particular by a calibrated scale mounted to slide longitudinally in the direction of the double headed arrow A with respect to the table 9 of the bed and which extends along the whole length of the latter.

The scale 33 which is guided and supported in particular by a roller assembly mounted on the bed framework, has an initial datum point corresponding to zero.

When the girder 28 is laid out on the table, the follower 31 is brought into contact with the end 28a of the girder 28 and the operator moves the machining unit along the scale 33 to bring the machining unit opposite the calibration on the scale corresponding to the machining co-ordinate at which the girder 28 is to be machined.

Figure 4:
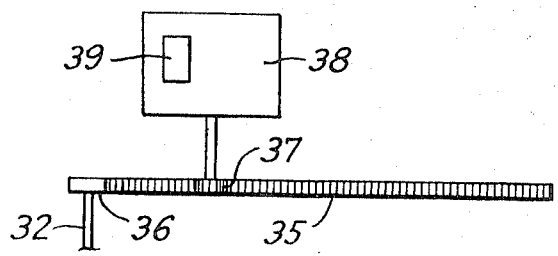
FIG. 4 shows a schematic view showing the use of a rack with a numerical counter.

According to another embodiment shown in FIG. 4, the measuring member is formed by a rack 35 whose teeth mesh with a pinion 37 which actuates a numerical counter 38 of the mechanical type, which includes a window 39 through which the operator can read the length measured off from the initial datum point 36 corresponding to zero.

In this case, after the follower has been brought into contact with the end 28a of the girder, the machining unit 6 is brought into line with the datum point 36 for which the counter 38 indicates zero and the machining unit is displaced until the required machining co-ordinate appears in the window 39.

FIG. 3 shows a ram 40 which is firmly attached to the machining unit 6 and moves longitudinally herewith. When machining of one of the faces of the girder 28 is finished, the ram 40 is actuated so as to press the girder 28 back by means of its movable member 41 and bring it within the reach of the turning device. This operation may be carried out in two stages by pressing the two ends of the girder back in succession.

Naturally, various modifications could be made by a man skilled in the art to the devices or processes which have just been described solely by way of non-limiting example, without departing from the scope of the invention as defined by the appended claims. For example, although reference is herein made to the machining of a girder, it will be apparent that the apparatus may be used for machining any member, particularly large and heavy structural members or parts.

I claim:

1. An apparatus for machining a work-piece comprising a fixed support, means for machining the workpiece, means for supporting the machining means above the fixed support and for moving the machining means with respect to the fixed support, and means for supporting and moving the work-piece into position for machining comprising a pair of substantially vertical bars laterally spaced from each other and movably fixed to the fixed support, means for moving each of said bars vertically with respect to the fixed support independently of the movement of the other bar, a slack deformable member fastened at one end to one bar and at the other end to the other bar and suspended therebetween for positioning the beam in front of the machining means, whereby a workpiece disposed on said deformable member may be moved upwardly with respect to the fixed support by movement in unison of the two bars and may be rotated about its axis by vertical movement of one bar with respect to the other.

2. An apparatus according to claim 1 wherein said means for moving the vertical bars comprises a rack on one edge of each bar and a pinion mounted on said fixed support, said rack meshing with said pinion, and means for rotating the pinion.

3. Apparatus according to claim 2, wherein said bars rest against two rollers firmly attached to said fixed support on the side opposite said pinion.

4. An apparatus for machining a beam or the like comprising a supporting base member, a means for machining the beam, means for supporting the machining means above the supporting base and for moving the machining means to and fro over the base, a pair of vertical bars laterally spaced at both ends thereof with one bar adjacent to said machining means, said bars being inclined towards each other above said base, each bar having a rack on an edge thereof, a pinion meshing with each rack and supported on said base, means for rotating the pinions to separately move the said bars vertically, vertically spaced guide rollers for holding said racks in meshing relationship with said pinions, and a slack deformable member fastened at one end to one bar and at the other end to the other bar and suspended therebetween for positioning the beam in front of the machining means, whereby a beam disposed on said deformable member may be moved upwardly by movement in unison of the two bars and may be rotated about its axis by vertical movement of one bar with respect to the other.

5. Apparatus according to claim 1, including further, a set of clamping jaws for said work-piece provided on said fixed support, said jaws being arranged to cooperate with a support member mounted on a jig assembly having a horizontal arm adapted to be moved vertically and horizontally.

6. Apparatus according to claim 1, wherein said machining unit is mounted to slide along said fixed support by means of rollers moving on rails firmly attached to said fixed support.

7. Apparatus according to claim 1, wherein a plurality of deformable means are distributed at set intervals along the whole length of said work-piece.

8. Apparatus according to claim 1, including further a device for clamping said work-piece positively to said fixed support in the vertical direction, said clamping device being mounted on a pillar on which said machining unit is mounted.

9. Apparatus according to claim 8, wherein said clamping device consists of a horizontal arm mounted to slide on said pillar, said arm bearing a ram having movable member arranged to contact a face of said work-piece.

10. Apparatus according to claim 1, wherein a measuring member solidly attached to an end follower for said work-piece is mounted to slide longitudinally on said bed.

11. Apparatus according to claim 10, wherein said follower is formed by the end of a movable member of a ram.

12. Apparatus according to claim 10, wherein said measuring member consists of a calibrated scale.

13. Apparatus according to claim 1, wherein a ram is fixed to said machining unit and has a member, arranged to move perpendicularly to the said fixed support, said movable member being arranged to make contact with said work-piece so as to press the latter back into the reach of the orienting means.

* * * * *